United States Patent
Goetzl

[15] 3,700,983
[45] Oct. 24, 1972

[54] VARIABLE CAPACITOR HAVING A SOLID DIELECTRIC BETWEEN ITS ELECTRODES

[72] Inventor: Manlio Goetzl, Yonkers, N.Y.

[73] Assignee: International Telephone and Telegraph Corporation, New York, N.Y.

[22] Filed: June 10, 1971

[21] Appl. No.: 151,658

[52] U.S. Cl..............................317/245, 317/251
[51] Int. Cl...............................................H01g 5/02
[58] Field of Search...............317/245, 251, 253, 258

[56] References Cited

UNITED STATES PATENTS

| | | | |
|---|---|---|---|
| 1,560,761 | 11/1925 | Cohen | 317/251 |
| 1,604,508 | 10/1926 | Fisch | 317/253 |
| 2,088,949 | 8/1937 | Fekete | 317/25 P |
| 2,137,135 | 11/1938 | Fuwa | 317/253 X |
| 3,217,217 | 11/1965 | Hoptroff | 317/253 |
| 3,366,852 | 1/1968 | Goetzl | 317/245 |

FOREIGN PATENTS OR APPLICATIONS 1,130,842  2/1957  France.......................317/253

Primary Examiner—E. A. Goldberg
Attorney—C. Cornell Remsen, Jr., Paul W. Hemminger, Walter J. Baum and Thomas E. Kristofferson

[57] ABSTRACT

A capacitor having a stationary electrode, a movable electrode, and a solid dielectric material between the electrodes. The solid dielectric occupies no more than a portion of the gap between the electrodes, and the remaining portion may be filled by a pressurized gas. Each electrode may be a series of spaced concentric tubular plates interleaved with the plates of the other electrode. The solid dielectric may be a layer covering some or all of the plate surface of one or both electrodes, and the dielectric layer may vary in thickness in the direction of relative movement of the electrodes.

13 Claims, 4 Drawing Figures

PATENTED OCT 24 1972

3,700,983

INVENTOR:
MANLIO GOETZL

BY Breitenfeld & Levine

ATTORNEYS

VARIABLE CAPACITOR HAVING A SOLID DIELECTRIC BETWEEN ITS ELECTRODES

This invention relates to variable electrical capacitors wherein a movable electrode may be adjustably positioned with respect to a stationary electrode to vary the capacitance value of the capacitor.

In these capacitors, each electrode usually comprises a series of spaced metallic plates interleaved with the plates of the other electrode. The interleaved plates are separated by a dielectric, which may be a vacuum, or may be air or some other gas at atmospheric or higher pressure. In some cases the capacitor is immersed in a liquid, usually an insulating oil, in which case the dielectric between the plates is the liquid itself.

The value of the capacitance for a given set of plates, and a given enmeshed area of the plates, is determined by the dielectric constant of the dielectric between the plates. For equal geometric configurations of the electrodes, the capacitance varies directly with the value of the dielectric constant. When the dielectric is vacuum the dielectric constant is theoretically unity. With gas of any types or pressures used, the dielectric constant is also unity for any practical purpose. When the plates are immersed in a liquid, the dielectric constant is usually 2 or more. The dielectric constant of a typical solid dielectric, such as ceramic, may be as high as about 9.

It is obvious that the use of a liquid or solid dielectric in the space between the interleaved plates has the advantage of attaining a higher capacitance for a given number and size of plates and given spacing between them. However, for higher radio frequencies and high power applications the use of a liquid or solid dielectric has the very objectionable drawback of a large power loss in the dielectric. The heat developed in capacitors employing liquid or solid dielectrics is high and they just cannot be used for voltages and powers above a certain level. On the contrary, the dissipation factor of capacitors with air, gas or vacuum between the plates is exceedingly low and the capacitors remain cool up to much higher power levels, have a high quality factor (Q), and their tuning characteristics are much sharper.

It is an object of the invention to provide a variable capacitor having increased capacitance as compared to comparable conventional capacitors, but in which the dielectric losses are maintained within acceptable limits.

This objective is achieved by providing a solid dielectric between the electrode plates of the capacitor, the solid dielectric occupying only a portion of the gap between any two opposed plate surfaces. The solid dielectric should have a relatively low dissipation factor and a high dielectric constant.

In a number of applications, both the applied voltage and the frequency decrease as the variable capacitor is tuned to higher capacitance values by increasing the enmeshed area of the interleaved plates. At lower frequencies and voltages the dielectric losses are much lower, since these losses decrease in direct proportion to the frequency and with the square of the voltage.

It is therefore another object of the invention to provide a variable capacitor wherein the thickness of the solid dielectric between the electrodes is a maximum when the capacitor is tuned to its maximum capacitance value, and the solid dielectric is either absent or much thinner when the capacitor is tuned to a lower capacitance value.

Another object of the invention is to provide a variable capacitor in which the gap between the electrode plates is partially filled with a solid dielectric, the balance of the gap being filled by a gas under pressure. This combination of solid dielectric and gas under pressure has been found in most cases to result in a capacitor of higher capacitance, higher voltage breakdown characteristics, and moderate losses.

Additional objects and features of the invention will be apparent from the following description in which reference is made to the accompanying drawings.

Figure 1:
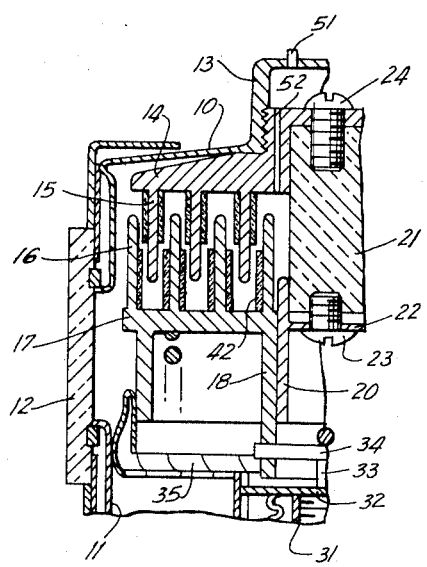
FIG. 1 is a fragmentary longitudinal cross-sectional view showing the interior of a capacitor made according to this invention.

The capacitor chosen to illustrate the present invention may be similar to the capacitor shown and described in U.S. Pat. No. 3,366,852. Such a capacitor includes a housing composed of conductive metallic end caps 10 and 11 (only a portion of end cap 11 being shown in FIG. 1) and an intermediate cylindrical section 12 of insulating material such as relatively thick ceramic.

The end cap 10 has a closed end or neck 13 of reduced diameter, interiorly threaded to engage with and rigidly support a metallic disc 14 on which a series of stationary electrode tubes 15 are mounted. These tubes are concentric with one another and with the axis of the housing. Three tubes have been shown, but they may be more or less in number, depending upon requirements. They may have a thickness of the order of .04 inch each.

Interleaved with the tubular electrode plates 15 is a similar series 15 mounted on a disc-like carrier 17. This series of plates is precisely fitted into the spaces between the plates 15 (the clearance being, e.g., of the order of .03 inch) and this spatial relation must be maintained during reciprocatory movements of the carrier 17 and tubes 16 in an axial direction. To serve as a reliable and accurate guidance for this movement, the carrier 17 is provided with a cylindrical sleeve 18 coaxial with the housing axis and slidably engaging a fixed tubular guide 20. The latter is secured to an insulating element 21 (composed for example of ceramic) by means of a flange 22 on the guide 20 and a fastener 23 screwed into the inner end of the element 21. At its outer end the element is similarly secured, as by a fastener 24, to the plate 14.

As a result of this arrangement, the two sets of interleaved electrode tubes are both supported by the same end cap 10, one being rigidly and immovably held, the other being supported for precise axial movement.

The movable electrode structure 16, 17 is reciprocated by an actuator which may be an externally threaded rod (not shown) engaging the internal screw threads of a cylindrical element 31 mounted for axial movement only and operatively connected to the movable electrode of the capacitor. A yoke 33 carried by the closed end 32 of cylinder 31, engaging a pin 34 carried by sleeve 18 serve as a flexible transmission between the actuator and the movable electrode. Thus, rotation of the actuator produces axial movement of the movable electrode. Carrier 17 which supports the plates 16 of the movable electrode is provided with a sliding contact 35 adapted to press yieldably and resiliently against the inner surface of end cap 11.

The electrode plates 15 and 16 have surfaces 39 and 40 (see FIG. 2), respectively, facing each other. Each pair of opposed surfaces are separated by a gap 41. According to the present invention, each gap 41 is partially occupied by a solid dielectric material. The most convenient way to introduce the solid dielectric into the gap 41 is by applying it as a coating to one or both opposed surfaces 39 and 40 of the electrode plates. The coating may be applied in any suitable manner. Thus, for example, a ceramic dielectric coating may be applied by spraying the liquid ceramic on to the electrode plates or dipping the plates into a liquid ceramic. In either case, the ceramic hardens into a solid dielectric layer. If the plates are aluminum, a solid dielectric coating of alumina oxide may be applied by anodizing the plates.

Figure 2:
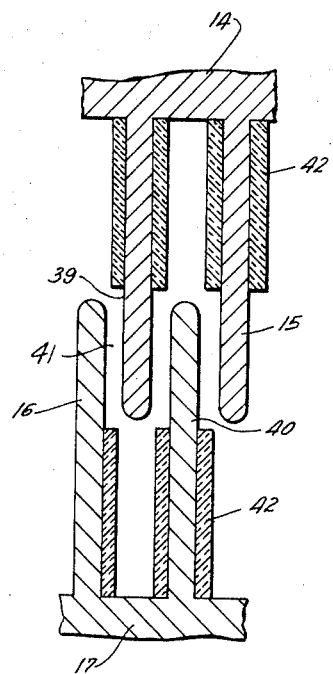
FIG. 2 is an enlarged view of a portion of FIG. 1 showing the electrodes in a different relative position.

In the embodiment of the invention shown in FIGS. 1 and 2, a solid dielectric layer 42 covers a little more than one-half the area of each plate surface 39 and 40, the remaining area being uncoated. The covered area is that portion of each surface closer to the plate carrier or support 14 or 17. When the electrodes are fully enmeshed, as shown in FIG. 1, i.e., the capacitor is adjusted at its maximum capacitance value, a substantial portion, e.g., 80 – 90 percent, of each gap 41 is filled with the solid dielectric 42. As the electrodes are moved away from each other to reduce the capacitance value of the capacitor, it will be apparent that the portion of gap 41 occupied by solid dielectric 42 decreases. When the relative position of the electrodes shown in FIG. 2 is reached, no solid dielectric whatsoever is present in gap 41. Thus, in this embodiment, the portion of gap 41 occupied by solid dielectric 42 varies, at different relative positions of the electrodes, between zero and 90 percent or even more.

Since, as mentioned above, in some applications the voltage and frequency involved are lower when the capacitance setting is high, the dielectric losses in the coating 42 are at acceptable levels when the capacitor is in the position shown in FIG. 1. However, when higher voltage and frequency is involved, the capacitance setting will be lower (e.g., as shown in FIG. 2) and hence less or no solid dielectric is present in the gap 41, thereby minimizing or eliminating the losses produced by the solid dielectric.

It has been found desirable to fill the portion of gap 41 not occupied by a solid dielectric with a gas under pressure, since the presence of such a gas increases the breakdown voltage of the capacitor. The filling of the housing with the desired gas under pressure may take place through the temporary nipple 51 formed on the end cap 10 (FIG. 1). After filling, the nipple is sealed off in any appropriate manner. To facilitate the entry of the gas into the interior regions, the attachment element 14 is preferably provided with at least one passage 52.

Figure 3:
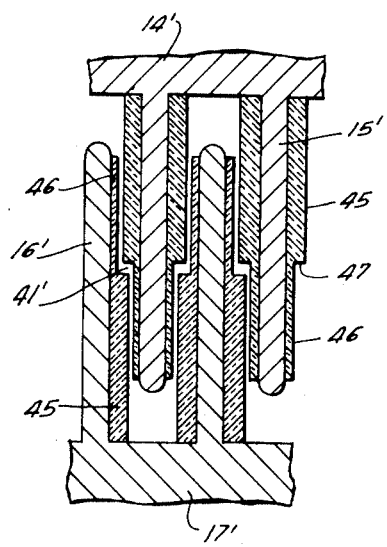
FIG. 3 is a view similar to FIG. 2 showing a different solid dielectric coating on the plates.

In the alternative embodiment of the invention shown in FIG. 3, the parts are identical to those of FIGS. 1 and 2 except for the form of the coating. Thus, stationary support 14' holds plates 15', and movable carrier 17' holds plates 16'. However, whereas coating 42 of FIGS. 1 and 2 covers only a portion of each surface 39 and 40 and has a uniform thickness, each surface of plates 15' and 16' facing a surface of another plate is substantially entirely covered with a solid dielectric layer having a thickness which varies in the direction of relative movement of the electrodes. Thus, the coating portion 45 closer to the support or carrier is thicker than the coating portion 46. Although in the configuration shown each dielectric layer has a single step 47, more steps may be employed to vary the thickness in several stages, or the variation may be continuous. It will be appreciated that with this embodiment the portion of solid dielectric in each gap 41' decreases as the capacitance value of the capacitor is decreased, as is true with the embodiment of FIGS. 1 and 2. However, in this case, a portion of the gap 41' is occupied by solid dielectric at every setting of the capacitor.

Figure 4:
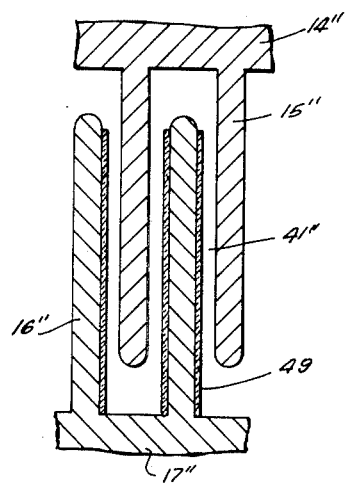
FIG. 4 is a view similar to FIG. 2 showing still another form of solid dielectric coating.

In the embodiment of FIG. 4, the parts are identical to those of FIGS. 1 and 2, except for the form of the coating. Plates 15" are mounted on stationary support 14" and plates 16" are mounted on movable carrier 17". Plates 15" carry no solid dielectric coating whatsoever. However, each surface of plates 16" facing a surface of plates 15" carries a thin solid dielectric coating 49. This coating may have a uniform thickness and can occupy about 10 – 20 percent of the gap 41". If a proper dielectric material, such as alumina oxide, is used having a relatively low dissipation factor and a high dielectric constant, its presence increases the capacitance of the capacitor without causing excessive dielectric losses.

The invention has been shown and described in preferred forms only and by way of example, but many variations may be made in it which will still be comprised within its scope. For example, in any of the embodiments described above, the solid dielectric coatings illustrated may be carried by the plates of one or both of the electrodes. Also, the thickness of the solid dielectric coating will be selected to occupy from 10 to 90 percent of the gap between plates depending upon factors such as the material of the coating and the application which the capacitor is to serve. It is understood, therefore, that the invention is not limited to any specific embodiment, except as defined in the appended claims.

What is claimed is:

1. A variable capacitor comprising a gas-tight cylindrical housing having a stationary electrode, a movable electrode spaced from said stationary electrode to provide a gap between said electrodes, means for varying the position of said movable electrode with respect to said stationary electrodes without varying the spacing between said electrodes so as to adjust the capacitance value of the capacitor, and a solid dielectric between said electrodes, said solid dielectric occupying no more than a portion of the gap between said electrodes in all relative positions of said electrodes and a gas under pressure higher than ambient pressure occupying the portion of said gap not occupied by said solid dielectric, said solid dielectric having a dielectric constant higher than that of said gas.

2. A variable capacitor as defined in claim 1 wherein the portion of said gap occupied by said solid dielectric is different at different relative positions of said electrodes.

3. A variable capacitor as defined in claim 2 wherein the portion of said gap occupied by said solid dielectric is greater when said electrodes are positioned to yield a higher value of capacitance than when they are positioned to yield a lower value of capacitance.

4. A variable capacitor as defined in claim 1 wherein each of said electrodes comprises at least one metallic plate, and said solid dielectric comprises a layer of material bonded to the plate comprising at least one of said electrodes.

5. A variable capacitor as defined in claim 4 wherein the plates of said electrodes have surfaces facing each other, and said solid dielectric layer covers only a portion of at least one of said surfaces, said covered portion being such that in certain relative positions of said electrodes no solid dielectric is present between said plates.

6. A variable capacitor as defined in claim 1 wherein each of said electrodes comprises at least one metallic plate, said plates having surfaces facing each other, and said solid dielectric comprises a layer of material bonded to only a portion of each of said surfaces, the portion of each surface carrying said solid dielectric facing the portion of the other surface which is not covered by said solid dielectric material.

7. A variable capacitor as defined in claim 1 wherein said solid dielectric occupies between 10 and 90 percent of the gap between said electrodes.

8. A variable capacitor as defined in claim 1 wherein said solid dielectric is alumina oxide ($AL_2O_3$).

9. A variable capacitor as defined in claim 1 wherein said electrodes are concentrically-arranged nested cylindrical tubes.

10. A variable capacitor as defined in claim 1 wherein said stationary electrode is a series of spaced cylindrical tubes concentric with one another, and said movable electrode is a similar series of spaced concentric tubes interleaved with the tubes of said stationary electrode.

11. A variable capacitor comprising a stationary electrode, a movable electrode spaced from said stationary electrode to provide a gap between said electrodes, means for varying the position of said movable electrode with respect to said stationary electrode without varying the spacing between said electrodes so as to adjust the capacitance value of the capacitor, and a solid dielectric between said electrodes, said solid dielectric occupying no more than a portion of the gap between said electrodes in all relative positions of said electrodes, each of said electrodes comprising at least one metallic plate, and said solid dielectric comprises a layer of material bonded to the plate comprising at least one of said electrodes, said solid dielectric varying in thickness so that the portion of said gap occupied by said solid dielectric is different at different relative positions of said electrodes.

12. A variable capacitor as defined in claim 11 wherein the thickness variation of said solid dielectric is such that the portion of said gap occupied by said solid dielectric is greater when said electrodes are positioned to yield a higher value of capacitance than when they are positioned to yield a lower value of capacitance.

13. A variable capacitor comprising a stationary electrode, a movable electrode spaced from said stationary electrode to provide a gap between said electrodes, means for varying the position of said movable electrode with respect to said stationary electrode without varying the spacing between said electrodes so as to adjust the capacitance value of the capacitor, and a solid dielectric between said electrodes, said solid dielectric occupying no more than a portion of the gap between said electrodes in all relative positions of said electrodes, each of said electrodes comprising at least one metallic plate, said plates having surfaces facing each other, and said solid dielectric comprises a layer of material bonded to each of said surfaces, the thickness of each solid dielectric layer varying in the direction of relative movement between said electrodes, the thinnest portion of each layer facing the thickest portion of the other layer.

* * * * *